United States Patent

Chalmin et al.

[11] Patent Number: 4,460,124
[45] Date of Patent: Jul. 17, 1984

[54] DOUBLE THROW VALVE

[75] Inventors: Jean-Pierre Chalmin, Plainville; John Doherty, Jr., Assonet, both of Mass.

[73] Assignee: Texas Instruments Incorporated, Dallas, Tex.

[21] Appl. No.: 494,149

[22] Filed: May 13, 1983

Related U.S. Application Data

[60] Division of Ser. No. 907,477, May 19, 1978, abandoned, which is a continuation of Ser. No. 583,131, Jun. 2, 1975, abandoned.

[51] Int. Cl.³ .................................................. G05D 23/10
[52] U.S. Cl. ...................................... 236/48 R; 236/87; 236/101 C
[58] Field of Search .................. 236/48 R, 87, 101 C; 137/DIG. 8; 337/365, 380

[56] References Cited

U.S. PATENT DOCUMENTS

| | | | |
|---|---|---|---|
| 82,565 | 9/1868 | Tamkin | 236/101 E |
| 1,622,778 | 3/1927 | Fowler | 236/101 E X |
| 3,506,194 | 4/1970 | Resseguie | 236/87 |
| 3,704,697 | 12/1972 | Weymann | 123/117 A |
| 3,954,222 | 5/1976 | Bjorklund et al. | 236/12 R |

Primary Examiner—William E. Tapolcai
Attorney, Agent, or Firm—John A. Haug; James P. McAndrews; Melvin Sharp

[57] ABSTRACT

An improved thermally actuated valve assembly having a double throw feature comprises three ports in which two passage routes are provided through the valve; one passage route connecting ports one and two and the other passage route connecting ports two and three. A snap acting strip type bimetallic member vertically mounted in the valve serves as a thermal element and valve member to cause a change in communication from one of the passage routes to the other.

5 Claims, 4 Drawing Figures

DOUBLE THROW VALVE

This application is a divisional of application Ser. No. 907,477 filed 05/19/78 which is a continuation of Ser. No. 583,131 filed 06/02/75, both now abandoned.

BACKGROUND AND SUMMARY OF INVENTION

This invention relates to a thermally actuated valve assembly and more particularly to a double throw thermal vacuum valve useful for instance for switching between vacuum and vent sources at a predetermined temperature in automotive emission control systems.

Various thermally actuated double throw valves have been used for automotive applications. For example, wax actuated double throw valves are used but have the disadvantage of high pressure build-up and subsequent loss of wax and consequently a shift of operating temperature. Double throw valves incorporating a bimetallic disc to move a valve member have also been used but they tend to be complex in design and therefore costly.

It is an object of this invention to provide a thermally responsive double throw valve of novel design. It is another object of this invention to provide a thermally responsive double throw valve in which the bimetallic member serves as a thermal element and a valve member while allowing sufficient flow rates.

It is yet another object of this invention to provide a double throw valve which is simple and economical to manufacture while being reliable. Other objects and features of this invention will be in part apparent and in part pointed out hereinafter.

Briefly, the double throw thermally responsive valve assembly of this invention comprises a valve body having two members, the first member having 3 ports and external nipple portions extending from the valve body and a second member with a central cavity into which the first member is partially housed. The first member has three separate passages contained therein extending respectively from one of the 3 ports to a central common chamber in the member. A snap-acting strip-type retangular bimetallic member is vertically secured within the chamber and positioned at a first temperature to block a first one of the passages from the other two and at a second predetermined temperature to snap over center and block a second one of the passages while opening the first thereby alternatively allowing communication between the second passage and a third common passage and the first passage and the common passage.

DESCRIPTION OF THE EMBODIMENTS

Figure 1:
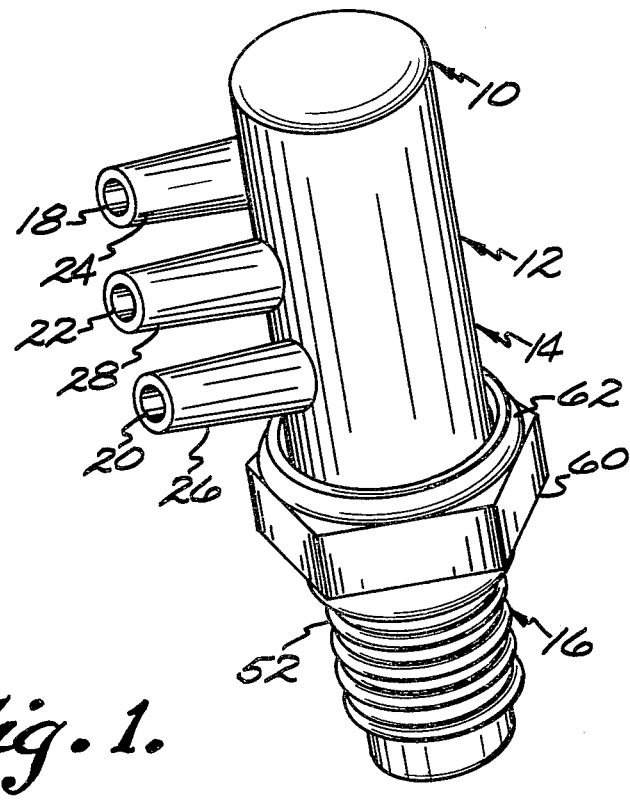
FIG. 1 is a perspective view of the valve assembly of the invention.
Figure 2:
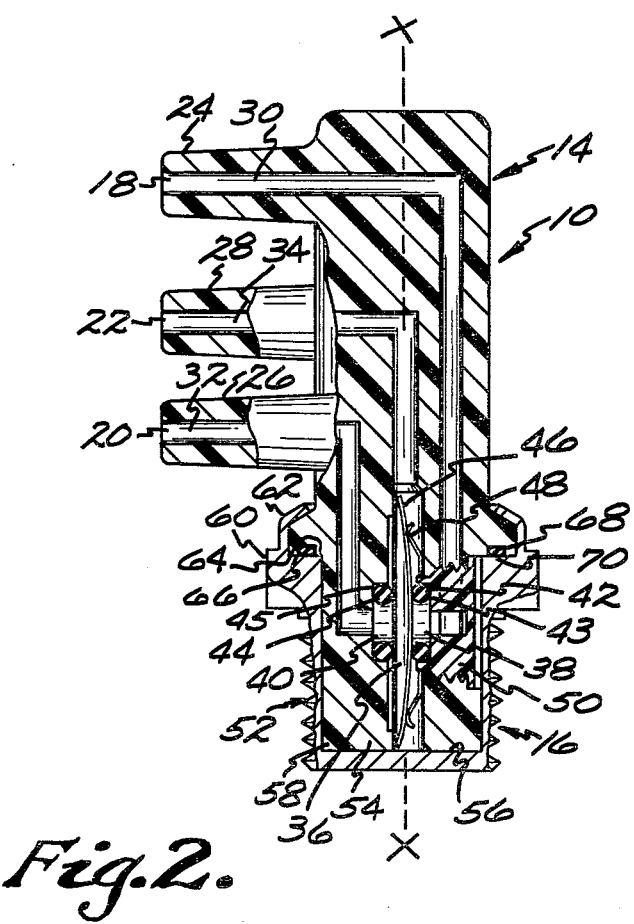
FIG. 2 is a partial section view of FIG. 1.

Referring now to the drawings, a double throw thermally responsive valve assembly 10 of this invention has a two member generally cylindrical valve body 12 comprising a first valve member 14 and a second valve member 16. First valve body member 14 as shown in FIGS. 1 and 2 has first, second, and third ports 18, 20, and 22 and external nipple portions 24, 26, and 28 which are generally perpendicular to body member 14 as seen in FIG. 2. The three ports 18, 20, and 22 each respectively have a separate passage 30, 32, and 34 connecting the ports with a central chamber 36 contained within first member 14. First valve member 14 with external nipple portions 24, 26, and 28 is preferably made from 2 molded pieces for ease of manufacture of a material such as glass filled nylon. The member would be split along a vertical line X—X as shown by FIG. 2 splitting the main housing of the member in two. As will be understood ports 18, 20, and 22 are connected with tubing (not shown) which run between valve 10 and the vacuum and vent sources and control functions which the valve operates.

In accordance with this invention as previously mentioned, central chamber 36 has passages 30, 32 and 34 entering it. Passages 30 and 32 preferably enter chamber 36 from the sides directly opposite one another as shown by FIG. 2. Passage 34 enters chamber 36 from the top and is the common passage adapted to be in communication with both passages 30 and 32. Openings 38 and 40 of passages 30 and 32 into chamber 36 serve as first and second valve seats 42, 44 for the valve. To provide for more reliable sealing a recess at openings 38 and 40 may be provided into which O-rings 43, 45 are press fit to serve as the valve seats.

A snap-acting bimetallic member 46 serves as the valve member and is positioned within central chamber 36. Bimetallic member 46 is preferably rectangular in shape having a short side and a long side. The short sides of the rectangle need be at least greater than the diameter of valve seats 42, 44 to ensure proper sealing and the long sides need be long enough so that when the bimetallic member is positioned vertically within valve 10 as shown by FIG. 2 a large deflection movement between a first valve member position and a second valve member position is provided to assure large valve opening channels necessary for allowing sufficient flow rates. Conventional circular snap-acting bimetallic members would require too large a diameter valve to provide the deflection movement needed to achieve sufficient flow rates. As shown in FIG. 2, strip member 46 is disposed in the first valve member position with its low expansion side in engagement with first valve seat 42. Upon heating of the strip member to a predetermined temperature, thermal stresses in the member will cause it to abruptly snap over center to the second valve member position in engagement with second valve seat 44. A valve spring member 48 is preferably used to engage the outside edges of strip member 46 and holds the strip member when in the second valve member position in engagement with second valve seat 44 applying sufficient force thereto to maintain the member closed against the seat. It will be understood that spring 48 exerts a sufficient force on member 46 to maintain it closed against second valve seat 44, but does not apply excessive forces thereto which may cause the elastomeric O-ring to permanently deform (i.e. undergo a permanent compression set) and result in leakage.

After positioning of member 46 and spring 48 in chamber 36, the two piece first valve member 14 is ultrasonically welded into one piece. It will be understood that a one piece valve member 14 may also be used.

The second valve body member 16 is shown to comprise a cup-shaped member adapted to be sealingly secured to first body member 14. More particularly, second body member 16 comprises a member of thermally conductive material such as brass having a preferably hollow threaded stud 52 and a central cavity 54 with a flat bottom 56 for reception of a circular body portion 58 of first body part 14. Body member 16 has a hexagonal shaped portion 60 enabling the valve assembly 10 to readily be inserted in a threaded hole and also a relatively thin wall 62 extending upwardly from hexagonal shaped portion 60. A shoulder 64 is formed at the junction of wall 62 with the remainder of portion 60 and against which a circular portion 66 of body member 14 bears when the two body members are assembled. A sealing gasket 68 (e.g. an O-ring) is disposed in a notched portion 70 of body member 14, and is compressed when side wall 62 is rolled over to sealingly secure the two valve portions together to form valve body 12.

When valve assembly 10 is installed in an engine, strip member 46 is in the first position as shown in FIG. 2 when the engine is cold thus sealing valve seat 42. This strip member positioning allows communication between second and third passages around the bimetallic valve and spring and consequently between ports 20 and 22. As the engine heats up, heat is conducted in body part 16 so as to heat strip member 46. As member 46 exceeds a predetermined temperature it snaps over-center to a second position which seals second valve seat 44. This condition allows for communication between first and third passages and also ports 18 and 22.

In a typical automotive emission control system, the snap temperature of strip member 46 is below a mean operating temperature to which the valve may be subjected. The temperature override beyond the valve switching temperature will cause the strip member 46 to continue to creep after snapping thereby exerting more force on second valve seat 44. In order to avoid compression set of the elastomeric valve seat material and overstressing of the strip material, spring member 48 is employed to absorb some of the force by deflecting at a predetermined force level.

If calibration of the valve is needed a threaded piece 50 containing valve seat 42 can be used. The calibration is controlled by moving valve seat 42 to apply more or less pressure against valve member 46.

Figure 3:
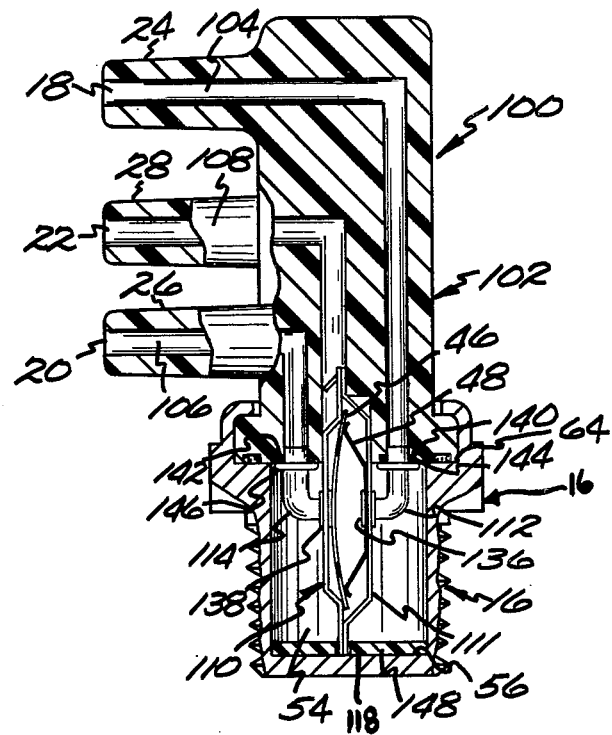
FIG. 3 is a partial section view of another embodiment of the valve assembly of this invention.

FIG. 3 shows another embodiment 100 of this invention which functions similar to valve 10 but provides further improvement to thermal response from external sources and more reliable calibration of both high and low snap temperature. Similar numbers will be used when a part in the second embodiment is identical to a previously described part.

Figure 4:
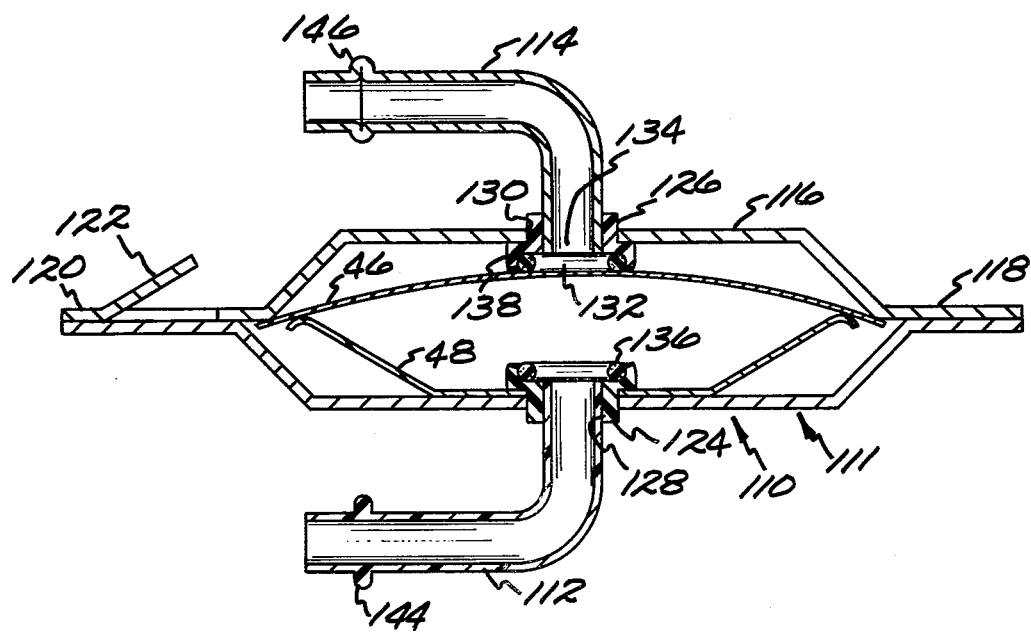
FIG. 4 is an enlarged section view of a valve housing member and connecting fluid lines of FIG. 3.

A first valve member 102 is modified to extend only part way into central cavity 54 of second member 16, thereby permitting better thermal response because there is minimal shielding by member 102 of thermostatic member 46 from thermally conductive member 16. Three separate passages 104, 106, and 108 are provided in member 102 for connecting ports 18, 20, and 22 with switching means 110 for the valve. Switching means 110 comprises a housing member 111, connecting fluid lines 112 and 114, thermostatic member 46 and spring 48 as best shown in FIG. 4.

Housing member 111 has a generally hexagonally-shaped open sided frame 116 with first and second arms 118, 120 extending therefrom. Second arm 120 in addition has a tab member 122 extending angularly outward for securing housing 110 in valve member 102 to be discussed in more detail below. Frame 116 and arms 118 and 120 and tab 122 are preferably made out of a rigid material such as steel.

Two bushings 124 and 126 are secured into openings 128 and 130 in frame 116, each bushing having a large diameter portion 132 and a small diameter portion 134. Large diameter portion 132 of bushings 124 and 126 each receive a respective resilient O-ring 136 and 138 which are preferably press fit therein. The O-rings 136 and 138 serve as first and second valve seats respectively for the valve and may be conveniently made from synthetic or natural rubber. Smaller diameter portions 134 of the bushings receive and securely hold one end of fluid lines 112 and 114. The opposite end of the fluid lines are secured in first valve member 102 to be discussed below. The fluid lines may conveniently be made from a flexible plastic.

A strip bimetallic member 46 and a spring member 48 similar to previously described members are positioned in housing 111 with member 46 in engagement with first valve seat 136 in the first valve member position. At a predetermined temperature, member 46 will snap to a second valve member position as shown by FIG. 3 in engagement with second valve seat 138.

Accordingly housing member 111 and fluid lines 112 and 114 are connected to first valve member 102. Arm 120 with tab 122 is press fit into the bottom wall of passage 108 as shown in FIG. 3. Tab 122 bites into the wall of passage 108 to prevent movement after insertion but still permitting flow through passage 108 into central cavity 54. Fluid lines 112 and 114 are secured in the bottom openings of passages 104 and 108 respectively preferably with the use of O-rings 140 and 142 positioned in the bottom openings of the passages and molded ledges 144 and 146 made in the fluid lines to ensure a tight seal. Thus, passage 104 with fluid line 112 and passage 106 with fluid line 114 respectively connect ports 18 and 20 to first and second valve seats 136 and 138. Port 22 is connected through passage 108 with central cavity 54 and consequently adapted to be in communication with either passage 18 or 20 through the side openings in valve housing 111.

Second valve member 16 is identical to the previously described value members in FIGS. 1 and 2 with the same means used for securing first member 102 therein except that member 102 is only inserted as far as shoulder 64. Also a notched brass washer 148 is placed on the flat bottom 56 of central cavity 54 into which arm 118 of housing 111 is placed. The washer is present to ensure proper alignment of the housing within the valve.

Calibration of valve 100 is controlled by deforming valve housing 111 to ensure that member 46 remains in sealing contact with the valve seats during movement of the member through the creep range prior to snapping. The housing may be deformed from both sides for proper calibration of both high and low snap temperatures. The calibration is done prior to assembly of the first and second valve members but it is effective to calibrate the valve in final assembled form because of the close proximity of member 46 relative to conductive metal member 16 with only a small air gap between.

Although the present invention has been shown and illustrated in terms of specific preferred embodiments, it will be apparent that changes and modifications are possible without departing from the spirit and scope of the inventions as defined in the appended claims.

We claim:

1. A thermally responsive valve assembly comprising an elongated generally cylindrical housing having a longitudinal axis, first, second and third passages formed in the housing with at least a portion of each extending in the same direction as the longitudinal axis, first, second and third ports formed in the housing and in communication respectively with the first, second and third passages, a first valve seat formed in the housing at an end of the first passage and a second valve seat formed in the housing at an end of the second passage, the first and second valve seats in facing relation to one another, a chamber formed in the housing between the first and second passages and in communication with the third passage, a frame disposed in the chamber, the frame having first and second walls facing one another, the first valve seat formed in the first wall and the second valve seat formed in the second wall, tubular means connecting the valve seats to their respective passages, a snap acting bimetallic valve member captured between the first and second walls, and means formed on the frame to lock it in the chamber, the valve member adapted upon selected temperature changes to move to and from the first and second valve seat and means biasing the valve member toward one of the valve seats.

2. A thermally responsive valve assembly according to claim 1 in which the first and second walls are bendable so that the valve assembly can be calibrated by bending the walls to move the location of the valve seats as desired.

3. A thermally responsive valve assembly according to claim 1 in which the frame is formed with an end portion with a tab projecting therefrom, the end portion received in a passage in the housing with the tab wedged in the wall defining the passage to lock the frame in place.

4. A thermally responsive valve assembly according to claim 3 in which a slot is formed in the housing and the frame is formed with another end portion which is received in the slot to ensure proper orientation of the frame relation to the passages.

5. A thermally responsive valve assembly according to claim 1 in which the valve member is generally rectangular having a longitudinal axis along its length and a lateral axis along its width, the valve member disposed in the frame so that its longitudinal axis extends in the same direction as the longitudinal axis of the housing.

* * * * *